Patented Nov. 15, 1927.

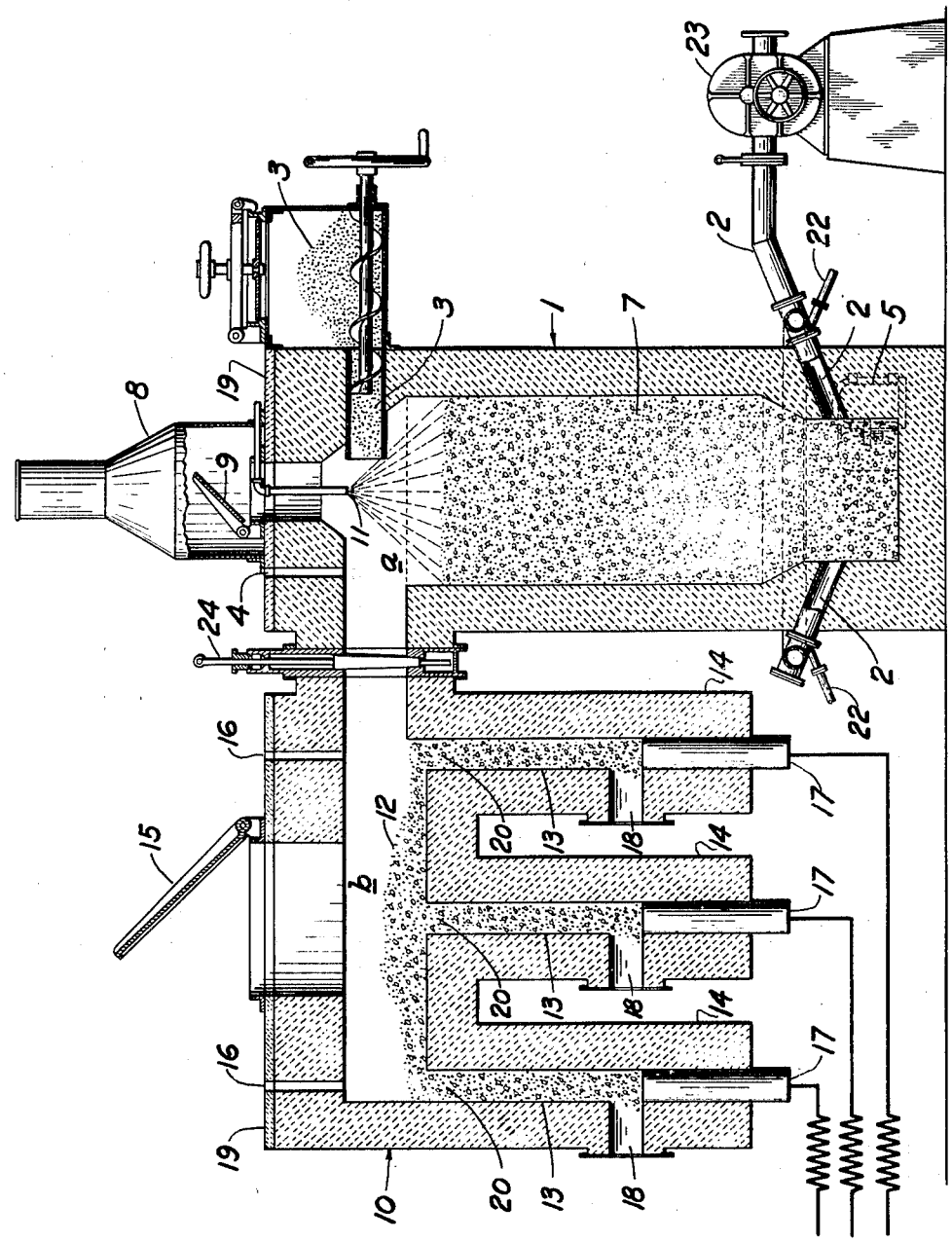

1,649,640

UNITED STATES PATENT OFFICE.

WILLIS STUART YARD AND EARL NEWMAN PERCY, OF OAKLAND, CALIFORNIA.

PROCESS OF GAS MANUFACTURE.

Application filed February 4, 1924. Serial No. 690,394.

This invention relates to a process of manufacturing gas from hydrocarbon liquids and carbonaceous solids and the production of a suitable apparatus for carrying out the process.

More specifically, the process relates to the generation of gas by the decomposition of oil or of oil and steam through the medium of electro-thermal action.

The drawing illustrates an apparatus in section, appropriate for the practice of the process.

In localities where crude oil is plentiful or where its use is economically advantageous over coal, it is common to manufacture gas from oil for municipal and other purposes; the gas thus produced being commonly known as oil gas as distinguished from coal gas and water gas, although water gas enters largely into the manufacture of modern oil gas.

A typical oil gas analysis resulting from a present day, well-known type of apparatus for municipal purposes is represented by the following:

Gals. of oil used per M. cubic feet of gas generated, 7.02.

Constituents (percentages by volume).

| | |
|---|---|
| $CO_2$ | 5.4 |
| $C_6H_6$ | 1.2 |
| $C_nH_{2n}$ | 2.9 |
| $O_2$ | 0.3 |
| $CO$ | 13.2 |
| $H_2$ | 47.5 |
| $CH_4$ | 26.1 |
| $N_2$ | 3.4 |
| Specific gravity | 0.485 |
| B. t. u. (calculated) | 553 |
| B. t. u. (observed) | 550 |

The intermittent process of making gas embodies two periods—a heating period and the gas making period. During the heating period the temperature of the apparatus is brought up to the gas making stage, usually of high incandescence, whether the interior work is carbon-coated checkerbrick or other carbon-coated refractory material. When the apparatus is brought up to a sufficient temperature, the apparatus is, of course, filled with products of combustion and it is necessary to arrest combustion and purge the apparatus of these products of combustion before the gas making period is entered upon. The heating period having come to an end, and the apparatus purged of the deleterious products of combustion, which, of course, are valueless as an illuminant or as a heating gas, oil and steam in a well-known manner are introduced into the highly heated apparatus; the steam serving the double function of atomizing the oil and of producing water gas.

The gas from the oil and steam is passed through the apparatus and fixed and thence conveyed through suitable washers and scrubbers to the holders and mains.

In this gas making period the temperature of the apparatus is somewhat reduced, due to the atomization of the liquid oil and the introduction of steam which is of relatively low temperature compared with the interior incandescence of the generator apparatus. As the temperature of the apparatus falls, the gas made changes somewhat both in quality and quantity; the gas being relatively thin or lean while the apparatus is at high temperature and relatively rich or heavier as the temperature falls.

During this period of gas making by the usual intermittent method, the generator brick cools somewhat and it becomes necessary to cease the gas making period and again blast the apparatus. In this period of reblasting or reheating and of bringing the interior of the generator up to incandescence, the checkerbrick work is reheated and the apparatus is once more brought up to a condition ready to make gas. This is an intermittent process.

We have aimed to produce an apparatus in which the gas making process may be carried on continuously. This, of course, can only be done by means and the mode of procedure which make it possible to maintain the solid gas making reagents or elements in the generator at a uniform gas making temperature and at the same time not introduce into the apparatus prohibitive quantities of anything in derogation, or what may be considered a diluent of a high-grade commercial gas.

These desired results are accomplished by the use of hydrocarbon liquids and hydrocarbon solids or carbonaceous solids by means of combustion of a portion of the carbon in combination with fixing by electrothermal or electrolytic action or a combination of both electrolytic and electrothermal action.

In carrying out the invention we make use of certain well known principles in the production of so-called producer gas and in the manufacture of oil and water gas, but our treatment of the gas by electrical action of the impressing upon the gas during manufacture of a high voltage electric current we believe to be new as well as the apparatus employed for the purpose.

Gas is produced this way: the nitrogen content of producer gas is far beyond any possibility of its use for illuminating or heating purposes; this nitrogen content being in excess of fifty (50%) percent of the gas so generated. It is our observation that prior to our invention many so-called continuous systems of gas-making failed of success, because of inherent incapacity to develop sufficient heat to gasify and fix the necessary quantity of oil requisite to act as a diluent to the excess of nitrogen.

We are aware of processes which use retorts and are open to the general objections to retorts as follows:

The transmission of heat through retorts results in their rapid deterioration. This is therefore complicated by the mechanical abrasion of solid fuels and by the action of the gases of combustion and the manufactured gases.

*Producer gas.*

If a shallow bed of fuel, especially coke, be blasted with air, the usual chief products of combustion will be $CO_2$, $H_2O$ and the nitrogen of the air which enters and leaves as an inert gas.

If a deep bed of coal be blasted with air, the chief products of combustion are $CO$, $H_2$, condensible vapors, distilled hydro-carbons, and inert nitrogen.

If a deep bed of coke be blasted with air, together with a small amount of steam, the chief products of combustion will be $CO$, $H_2$, distilled hydrocarbons, a certain amount of $CO_2$, and inert nitrogen.

This is the gas usually referred to as "producer gas." It has an average calorific value of usually 150 B. t. u. per cubic foot and is useful only for industrial processes, being worthless for domestic uses because of the enormous distributing system necessary and the low temperature of the flame.

We have referred to producer gas because in our practice we have made use, for matters of convenience, of a gas producer in our apparatus, although, manifestly, our process is not necessarily limited to an initial form of producer gas as such.

Having reference to the accompanying drawing:

The figure illustrates in vertical section an apparatus suitable for carrying out the process.

Probably the most important object of our invention is the practical development of a continuous process of making gas from liquid or solid fuels by the use of electricity. Most processes in practice, and of which we have knowledge, up to the present time are, as already pointed out, intermittent and involve the periodic heating up and cooling down of various parts of the apparatus, different kinds of gases are given off at every instant of operation, and at no time is it possible to maintain an optimum of conditions or to make an optimum quality of gas desired. In our continuous process it is possible to have: economy due to cheap electricity, fixed optimum conditions, increased output, reduced investment, decreased wear, and uniform quality of gas. Specifically we bring about: increased content of $CH_4$, decreased content of $CO_2$, and $O_2$, absolute control of constituents, absolute control of calorific value, control of oxygen-loss, ability to maintain conditions once established, greater ease and thoroughness in purification, scrubbing and treating because of uniform flow of the gas, substantial elimination of free carbon in the gas, substantial elimination of tar, decrease of physical bulk of gas works, and decreased smoke and inert gases.

We have obtained these objects by:

First. Operating an ordinary gas producer by blasting it with air or oxygen.

Second. By injecting liquid fuel into the solid fuel bed, usually from above.

Third. Passing these vapors and gases through a body of granular or porous carbon heated by electricity.

Fourth. Adding liquid fuel to vapors and gases before they pass through the porous carbon. The purpose of this addition is to increase the proportion of oil gas to a point where the diluent nitrogen of the gas generated is reduced to a desired percentage.

Fifth. Adding water or steam or air or oxygen to the vapors or gases before passing through the electrically heated carbon in order to gasify deposited carbon and prevent the heated carbon from plugging up with the carbon deposited from the oil vapors.

Sixth. Control of temperature of the heated carbon by control of the electricity.

Seventh. Control of temperature of the heated carbon by varying the pressure of the carbon and thus varying electrical resistance.

Eighth. Electrolytic, electro-thermic or electro-ionic action as is shown by the results, the exact nature of which reaction may be later ascertained by ourselves or others.

Manifestly, variations in practice and apparatus may occur without material departure from the invention or inventions involved.

Description of apparatus.

*The gas producer.*—This process may be performed with several types of apparatus of which we find the following convenient:

The first section of the apparatus is an ordinary up-draft producer with provisions for a blasting means 2, means of putting in solid fuel 3, sight holes 4, for observation and poking, or the like.

If operating with oil carbon alone, it is not necessary for the producer to have grates or provision for ash and clinker removal. If operating on commercial solid fuels, provision must be made for clinker and ash removal, as at 5. By "oil carbon" we mean the carbon residue from cracked petroleum oils.

In working with oil carbon we have found the pulsating type of blower 23 useful because it keeps the fuel 7 pulsating which tends to settle it and prevent clinkering or arching.

There is also a stack 8 and stack valve 9 in order that the producer 1 may be blasted when heating up without passing the products through the cracker 10, hereafter described.

We have found it convenient to inject the oil from an opening 11, adjacent to the stack valve 9, down to the surface of the fuel bed 7. The important feature of liquid fuel injection is, that to avoid the formation of lampblack the fuel is allowed to flow in a solid stream or coarse spray which tends to form granular coke rather than lampblack.

*The "cracker".*—The second section of our apparatus we have designated the "cracker". It consists in practice of a cylindrical, pancake layer of carbon 12, from which three legs 13 extend downward. The whole may be embraced in a single circular shell having the legs divided by suitable brick work 14, or may consist of separate steel-encased legs 13, connected in any suitable manner at the top. Provision is made for the introduction of solid carbon through the door 15. 16 are oil connections for maintaining a sufficient supply of oil by which the carbon pancake 12 may be continuously replenished and maintained after the apparatus is in operation.

The space or chamber *a* at the top of producer 1 is in open communication with the chamber *b* at the top of the cracker 10, except as the two chambers may be divided by the gates 24.

At the base of the three legs are suitable terminals for the electric connections 17. 18 are offtakes for the gas.

It is desirable to use electrically non-conducting types of brick 14 and heat-insulation 19 for two reasons. First: conservation of electrically generated heat is of paramount importance because of its expense. Second: some firebrick and other heat-resisting media become excellent electric conductors at high temperatures, but are unsuitable for best results in our practice. Ordinary firebrick carefully selected are non-conductors at high temperature and serve our purpose.

The finished gases issue from the offtakes 18 at the bottom of the legs 13 at a high temperature.

Thence they may be carried through certain high-temperature purification devices and certain waste-heat devices in order to conserve this heat, although this may not necessarily be a part of our invention; in fact, it is recognized gas practice.

*Preparation for operation.*—In preparing the apparatus for operation, the "cracker" 10 is first filled with carbon fuel 20, preferably pure oil carbon, and blasted until free from hydrocarbons, as the hydrocarbons have an important effect upon the electrical resistance, which they increase. The electricity is then turned on at several hundred volts, even nearly a thousand volts, according to the condition of the carbon 12 and the pressure upon it, in order to bring the carbon to a state of incandescence.

While the carbon 12 is heating (which may require anywhere from one to ten hours, according to the amount of electricity and the efficiency of the heat insulation) the "producer" 1 is prepared as follows: it is first filled with solid fuel 7, which is ignited usually by a gas flame at 22 in the blast and blasted with air from blower 23. During this preliminary blasting period the blast-gate 24 between the "producer" 1 and the "cracker" 10 is closed and the "producer" stack-valve 9 is opened and the products of preliminary blasting escape into the atmosphere.

When the "producer" 1 and the "cracker" 10 are both at the proper temperature (approximately 2,000° F. as shown by an optical pyrometer and subject to control after gas production is commenced), the blast gate 24 between the "producer" 1 and the "cracker" 10 is opened and the stack valve 9 on the "producer" 1 closed. The "producer" gas immeditely begins to pass through the "cracker" 10 and out of the offtakes 18 at the bottom of the legs 13 into the washboxes or waste heat devices, or the like, not necessary here to be shown.

The oil spray from pipe 11 is then turned into the "producer" 1 and gradually increased until the "producer" gas offtake 18 shows a temperature of about 600° F.

Under these conditions, if atmospheric blast air is being used, the gas produced at the top of the "producer" shows a nitrogen content of approximately 55%.

Before the gas can be utilized for heating and lighting purposes it is necessary to reduce this nitrogen content to approximately 12%. To accomplish this, the generated vapors and gases are carried to the "cracker" 10, where other oil with steam is admitted at 16, so that the oil and water gas generated in chamber $b$ is increased to a point where the nitrogen content of the final gas mixture sinks to 5% or 10% according to the requirements of the community where the gas is made.

The gas in chamber $b$ is raw gas and becomes fixed only after being subjected to our electro-thermal treatment as it passes to the offtake 18.

The steam, injected with the oil at 16 in the top of the "cracker" serves the double purpose of atomizing the oil and (what is more important) of taking up the carbon deposited, forming CO, together $H_2$, $CH_4$, and the like, and adding to the general volume of the gases produced. This reaction is believed to take place partly with the deposited carbon 20 and partly with the carbon in the gas rendered incandescent and nascent by the heat radiated from the carbon granules 20.

It is also believed that there is an electrolytic or electro-ionic action in the "cracker" 10 as well as the electro-thermic action, because at the higher voltages, arcing takes place between the different granules 20 and the change of quality of gas produced, points sharply to the higher voltages tending to show results in greater ratio than the increase of temperature and due possibly to pure electric action of some kind.

Results obtained.

The net results obtained are a gas high in methane, low in condensable products of any desired thermal value; a constant output and all the benefits of a continuous process as opposed to the intermittent processes in use up to the present time.

Having thus described our invention, what we claim and desire to secure by Letters Patent is:—

1. A method of manufacturing a gas suitable for domestic use from hydrocarbons, which consists of continuously air blasting a bed of ignited carbon to incandescence in a gas producer, continuously injecting oil onto the bed to cause decomposition of the oil, fixing the gases by passing the gases from the producer through a foraminous mass of incandescent carbon, adding oil to the last-named mass to enrich the gases, and maintaining said foraminous mass of carbon incandescent by the passing of electric current therethrough.

2. A method of manufacturing gas suitable for commercial purposes from hydrocarbons, which consists of continuously blasting with air a bed of ignited carbon to incandescence in a gas producer, injecting oil onto the bed of ignited carbon to cause gasification of the oil, passing the gases from the producer through a secondary chamber containing a foraminous mass of incandescent carbon whereby to fix the gases, introducing oil into the secondary chamber so as to crack the same and bring about a reduction in the nitrogen content in the mixed gases, admitting steam with the oil in said secondary chamber to assist in atomizing the oil and control the deposition of free carbon therefrom, and maintaining the foraminous mass of carbon in the secondary chamber incandescent by the passage of electric current therethrough.

WILLIS STUART YARD.
EARL NEWMAN PERCY.